(No Model.)
L. H. LEBER & E. H. NEIMAN.
WIRE FASTENER FOR HEDGE FENCES.
No. 356,721. Patented Jan. 25, 1887.
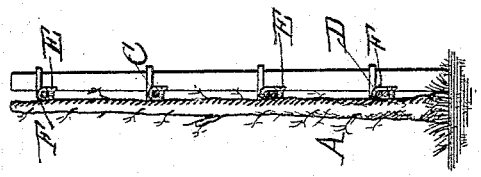
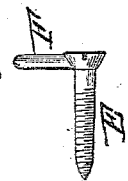
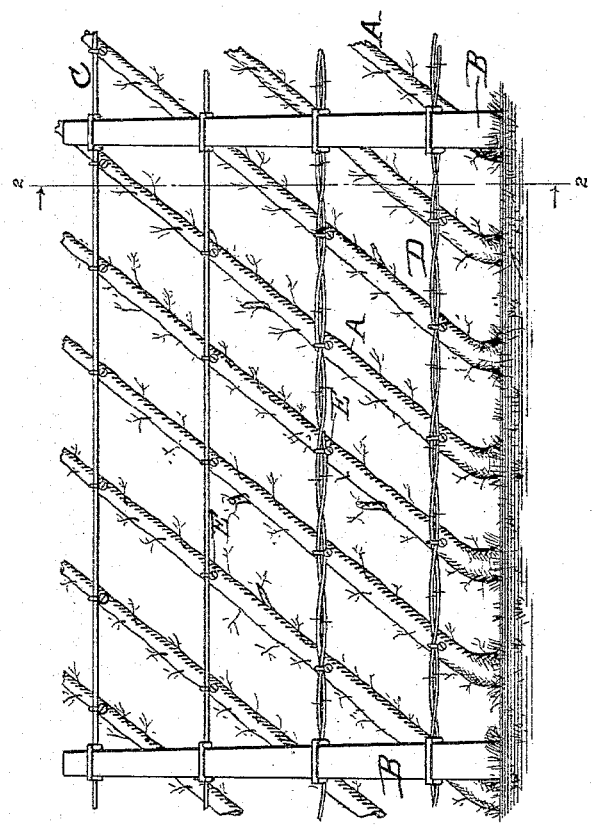
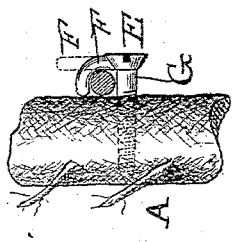
Witnesses
H. A. Lamb.
Henry Gardner Jr.
Inventors
Luther H Leber and
Eli H. Neiman
By their Attorney
Chas J. Gooch

UNITED STATES PATENT OFFICE.

LUTHER H. LEBER AND ELI H. NEIMAN, OF YORK, PENNSYLVANIA.

WIRE FASTENER FOR HEDGE FENCES.

SPECIFICATION forming part of Letters Patent No. 356,721, dated January 25, 1887.

Application filed November 17, 1886. Serial No. 219,170. (No model.)

*To all whom it may concern:*

Be it known that we, LUTHER H. LEBER and ELI H. NEIMAN, citizens of the United States, residing at York, in the county of York and State of Pennsylvania, have invented a certain new and useful Hedge-Fence Fastener; and we do hereby declare the following to be a full, clear, and exact description of the invention, such as will enable others skilled in the art to which it appertains to make and use the same.

This invention relates to certain improvements in the construction of live hedges.

In the rearing of live hedges it is desirable, after the plants have grown to the proper size, which is usually the third or fourth year after planting, to bend or incline the main stalk of the several plants, in order to secure the best results. This has been accomplished in various ways—such, for instance, as partially severing or cutting the body of the plant near the ground, then bending it over and securing it by pegs or stakes driven into the ground, or securing them in position by wire braces, or by driving staples into the stems or bodies of the plants to secure them to a horizontal wire, or by hooking one end of a wire over the horizontal wires and curving or hooking the other end partly around the plant. The objection to the last-named arrangement is, that as the plant grows the increase in its diameter will force the hooked portion of said wire in contact with the plant open and away from the plant, and thus destroy the very object sought to be secured—viz., the holding of the plants to the horizontal wires. Where staples are employed, they are apt to split the plant, and there is no provision for adjustment to the growth of the plant.

Our improved fastener consists of a screw or its equivalent, as a threaded pin, formed of suitable metal or material and provided at its head with a right-angled prong or extension of malleable or pliable material.

In the accompanying drawings, Figure 1 represents a side elevation of a section or panel of a hedge fence constructed according to our improvements, except that in practice we would not employ the posts B there shown. Fig. 2 represents a vertical section on the line 2 2 of Fig. 1. Figs. 3 and 4 represent detail views of the fastening separate from and connected to a plant and horizontal wire.

A represents the plants.

B represents posts, which may be used, if desired, although we design to construct our fences without such posts, as it is found in practice that with our improved means for connecting, fastening, and supporting the plants and wires together the employment of such posts, as B, is not necessary.

C represents the top wires, which, according to our improvements, are preferably plain; and D represents the lower wires, which are barbed. These parts are of ordinary construction, and the plants may be planted and trained in any of the well-known ways.

Our improved device for fastening or wiring the plants and securing them and the horizontal wires C D together consists of a screw, E, or its equivalent, as a threaded pin, of suitable metal or material, having an outwardly-extending prong or extension, F, at or near its head, said prong being formed of suitable malleable metal or pliable material capable of being bent over the horizontal wires, as represented in Figs. 2 and 3 of the drawings. This prong F may be formed separately from the screw and attached thereto in any suitable manner—such, for instance, as by soldering; but it is preferred that it be formed integral with the screw, which can readily and cheaply be done by forming both parts out of pliable metal.

As clearly represented in the drawings, the screws E, or the equivalents thereof, are screwed into the plants (see Fig. 3) for a sufficient distance, leaving a portion of the head or top part of the screw, as G, projecting beyond the plant, so as to form a rest for the wires. The prong F is then turned over the wire or wires adjacent thereto, as represented in full lines in Fig. 3, and thus the wires are securely clamped to the plants. As the prong F, when thus turned over across the wire, rests at a right angle thereto, it will be observed that as the plant increases in circumference by its growth it will constantly tend to tighten the connection between it and the securing device, and the prong will not be forced open so as to loosen the connection.

By permitting the screw to extend at its head beyond the plant, and by curving the prong around and across the adjacent wire, it will be observed that the wires are braced on all sides and securely clamped and held in position without the possibility of their becoming loose, either by the growth of the plant or in the course of ordinary wear.

The combined wire and plant clamping device herein described can be very cheaply constructed and readily applied in position by even unskilled workmen, and its use will insure the securing of the firm and rigid connection of the several parts at all times, and thus result in securing a firm and rigid fence without the necessity of employing any supporting-posts, as B, for the reason that each of the horizontal wires is supported on the projecting portion of the several screws or threaded or ribbed prongs or pins, and they and the several plants are at sufficiently frequent intervals clamped together, thus securing the effectual supporting and binding together of each member of the fence throughout the entire body of the fence, by which means a very rigid and strong fence is secured throughout its entire area. By placing barbed wires at the bottom of the section or panel, as shown, pigs and other small animals will be prevented from forcing their way through the bottom of the fence should there be any opening therein.

The portion E of the fastening need not necessarily be a regular screw; but as the plants are soft and can be easily penetrated, such portion may be formed of some suitable soft metal and shaped with threads or ribs thereon, and by reason of the softness of the plants the screw or its equivalent can be readily inserted in the plants by simply grasping the prong F thereon with the thumb and finger and turning the part E around thereby. Although we have shown the portion E as provided with the customary groove to receive the point of a screw-driver, such groove is not essential, for the reason that it can readily be turned by hand through the medium of the prong F, as before explained.

Another advantage of our construction is, that by forming the prong F of pliable metal, whenever desired, such part can readily be bent back to a straight or nearly straight position, and the part E of the fastening within the plant turned around by hand when desired to adjust or regulate the tension on the wires and accommodate them and the fastening to the increased growth of the plants, prevent undue strain upon the wires, take up any slack thereof, and avoid the necessity of girdling the plants. Such an adjustment can, manifestly, be very readily and speedily accomplished and the fasteners secured in position by an unskilled person without the necessity of employing tools.

By means of our fastening the wires can be readily and expeditiously clamped by hand to the plants in a strong and substantial manner and the plants held in any position desired, and when secured in the manner herein described they will offer great resistance to any force brought to bear against the hedge.

Having thus described our invention, what we claim is—

The herein-described wire fastener for hedge fences, consisting of the screw E, having the straight prong F extending at a right angle from the head portion thereof, said prong being formed of pliable metal, as set forth.

In testimony that we claim the above we have hereunto subscribed our names in the presence of two witnesses.

LUTHER H. LEBER.
ELI H. NEIMAN.

Witnesses:
GEORGE A. MAYER,
WM. BEITZEL.